United States Patent
Jiang et al.

(10) Patent No.: US 9,798,956 B2
(45) Date of Patent: Oct. 24, 2017

(54) METHOD FOR RECOGNIZING TARGET OBJECT IN IMAGE, AND APPARATUS

(71) Applicant: Huawei Technologies Co., Ltd., Shenzhen (CN)

(72) Inventors: Zhuolin Jiang, Shenzhen (CN); Yangqiu Song, Hong Kong (HK); Qiang Yang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/193,209

(22) Filed: Jun. 27, 2016

(65) Prior Publication Data

US 2016/0307070 A1    Oct. 20, 2016

Related U.S. Application Data

(63) Continuation of application No. PCT/CN2014/090976, filed on Nov. 13, 2014.

(30) Foreign Application Priority Data

Dec. 27, 2013 (CN) .......................... 2013 1 0739555

(51) Int. Cl.
  *G06K 9/62* (2006.01)
  *G06K 9/46* (2006.01)
(52) U.S. Cl.
  CPC ............. *G06K 9/6256* (2013.01); *G06K 9/46* (2013.01); *G06K 9/6218* (2013.01)
(58) Field of Classification Search
  CPC ...... G06K 9/6256; G06K 9/6218; G06K 9/46; G06K 9/66; G06K 9/6217; G06K 9/6255;
  (Continued)

(56) References Cited

U.S. PATENT DOCUMENTS 9,704,054 B1 *   7/2017 Tappen .................... G06K 9/46
2003/0007683 A1 * 1/2003 Wang ................. G06K 9/00456
                                                         382/159
(Continued)

FOREIGN PATENT DOCUMENTS

CN       1559051 A    12/2004
CN     101226590 A     7/2008
(Continued)

OTHER PUBLICATIONS

Foreign Communication From a Counterpart Application, PCT Application No. PCT/CN2014/090976, English Translation of International Search Report dated Feb. 26, 2015, 2 pages.

(Continued)

*Primary Examiner* — Amir Alavi
(74) *Attorney, Agent, or Firm* — Conley Rose, P.C.

(57) ABSTRACT

A method for recognizing a target object in an image, and an apparatus, where the method includes extracting feature data from an image, and transforming the extracted feature data into a uniform expression, performing automatic clustering for features in the image according to the feature data in the uniform expression and a historical clustering result, grouping a target object of a known class included in an automatic clustering result into the corresponding known class, in order to recognize a target object of the known class in the image, and training a classifier in a machine learning manner, for a target object of an unknown class included in the automatic clustering result, in order to recognize a target object of an unknown class in the image. In the embodiments of the present invention, recognizing a target object of an unknown class can be implemented.

12 Claims, 3 Drawing Sheets

(58) Field of Classification Search
CPC .............. G06K 9/6216; G06K 9/00228; G06F 17/30249
See application file for complete search history.

(56) References Cited

U.S. PATENT DOCUMENTS

| | | |
|---|---|---|
| 2003/0063780 A1 | 4/2003 | Gutta et al. |
| 2004/0096100 A1* | 5/2004 | Ii .......................... G06K 9/628 382/159 |
| 2011/0158535 A1 | 6/2011 | Iio et al. |
| 2013/0108180 A1 | 5/2013 | Ohtani et al. |
| 2013/0336579 A1* | 12/2013 | Rashad Mohamed ............ G06K 9/6256 382/159 |
| 2015/0036919 A1* | 2/2015 | Bourdev .............. G06K 9/6256 382/156 |
| 2016/0275415 A1* | 9/2016 | Yoo ....................... G06N 99/005 |
| 2016/0307070 A1* | 10/2016 | Jiang .................... G06K 9/6218 |
| 2016/0379091 A1* | 12/2016 | Lin .................... G06K 9/00724 382/156 |
| 2017/0140213 A1* | 5/2017 | Brandt ............... G06K 9/00295 |

FOREIGN PATENT DOCUMENTS

| | | |
|---|---|---|
| CN | 102289686 A | 12/2011 |
| CN | 102546625 A | 7/2012 |
| CN | 103065122 A | 4/2013 |
| CN | 103117903 A | 5/2013 |
| CN | 103177264 A | 6/2013 |

OTHER PUBLICATIONS

Foreign Communication From a Counterpart Application, PCT Application No. PCT/CN2014/090976, English Translation of Written Opinion dated Feb. 26, 2015, 5 pages.
Machine Translation and Abstract of Chinese Publication No. CN102546625, Jul. 4, 2012, 8 pages.
Machine Translation and Abstract of Chinese Publication No. CN103065122, Apr. 24, 2013, 8 pages.
Machine Translation and Abstract of Chinese Publication No. CN103117903, May 22, 2013, 11 pages.
Foreign Communication From A Counterpart Application, Chinese Application No. 201310739555.3, Chinese Office Action dated Aug. 1, 2017, 6 pages.

* cited by examiner

METHOD FOR RECOGNIZING TARGET OBJECT IN IMAGE, AND APPARATUS

CROSS-REFERENCE TO RELATED APPLICATIONS

This application is a continuation of International Application No. PCT/CN2014/090976, filed on Nov. 13, 2014, which claims priority to Chinese Patent Application No. 201310739555.3, filed on Dec. 27, 2013, both of which are hereby incorporated by reference in their entireties.

TECHNICAL FIELD

The present disclosure relates to the field of computer technologies, and in particular, to a method for recognizing a target object in an image, and an apparatus.

BACKGROUND

Digital image understanding includes several levels, such as image segmentation, edge detection, and image target detection and recognition. Image target detection and recognition is used to recognize people or an object in an image, and perform classification tagging for the image (for example, areas in the image are separately tagged as sky, beach, sun, and the like). A most typical type of problem is recognizing a type of object in an image, for example, a Caltech101 dataset is a similar problem. Image target detection and recognition is one of main issues in the field of computer vision, and also an important breakthrough point in the field of artificial intelligence.

Currently, a target detection method is usually implemented by fixing a type of object, modeling for a shape or an edge (even a bounding box) of the object, scanning a position of the object in an image, and performing fitting. Edge detection may be implemented using a method such as the Canny operator. Shape or edge modeling and tracing may be implemented using a method such as condensation, Kalman filter, or mean shift.

Because target detection is usually used to determine a known type of object (such as a human face, a human body, and a particular type of object), understanding of an object of an unknown class is not involved. If a new target is not included in objects that need to be traced, it is difficult to determine the target.

SUMMARY

Embodiments of the present disclosure provide a method for recognizing a target object in an image, and an apparatus, which may be used to recognize a target object of an unknown class.

A first aspect of the present disclosure provides a method for recognizing a target object in an image, where the method may include extracting feature data from an image, and transforming the extracted feature data into a uniform expression, performing automatic clustering for features in the image according to the feature data in the uniform expression and a historical clustering result, grouping a target object of a known class included in an automatic clustering result into the corresponding known class, in order to recognize a target object of the known class in the image, and training a classifier in a machine learning manner, for a target object of an unknown class included in the automatic clustering result, in order to recognize a target object of an unknown class in the image.

With reference to the first aspect, in a first feasible implementation manner, the training a classifier in a machine learning manner, for a target object of an unknown class included in the automatic clustering result, in order to recognize a target object of an unknown class in the image may include performing classification tagging for the unknown class included in the automatic clustering result, and training the classifier for the unknown class with a classification tag using transfer learning, in order to recognize the unknown target object in the image.

With reference to the first feasible implementation manner of the first aspect, in a second feasible implementation manner, the performing classification tagging includes acquiring, in a human computer interaction manner, classification tag information entered by a user, or searching the Internet for an image whose similarity to the unknown class meets a specified requirement, and performing classification tagging for the unknown class according to tag information of the image on the Internet.

With reference to the first feasible implementation manner of the first aspect, in a third feasible implementation manner, the training the classifier for the unknown class with a classification tag using transfer learning, in order to recognize the unknown target object in the image includes updating an existing classifier according to the automatic clustering result, and training the classifier for the unknown class with the classification tag using the transfer learning method and the updated existing classifier, in order to recognize the unknown target object in the image.

With reference to any one of the first aspect to the third feasible implementation manner of the first aspect, in a fourth feasible implementation manner, after the performing automatic clustering for features in the image, the method further includes updating the historical clustering result according to the automatic clustering result.

A second aspect of the present disclosure provides an image processing apparatus, which may include a feature acquiring module configured to extract feature data from an image and transform the extracted feature data into a uniform expression, an automatic clustering module configured to perform automatic clustering for features in the image according to the feature data in the uniform expression transformed by the feature acquiring module and a historical clustering result, a first classifying module configured to group a target object of a known class included in an automatic clustering result into the corresponding known class, in order to recognize a target object of the known class in the image, and a second classifying module configured to train a classifier in a machine learning manner, for a target object of an unknown class included in the automatic clustering result, in order to recognize a target object of an unknown class in the image.

With reference to the second aspect, in a first feasible implementation manner, the second classifying module includes a tagging module configured to perform classification tagging for the unknown class included in the automatic clustering result, and a class learning module configured to train the classifier for the unknown class with a classification tag using transfer learning, in order to recognize the unknown target object in the image.

With reference to the first feasible implementation manner of the second aspect, in a second feasible implementation manner, the tagging module is further configured to acquire, in a human computer interaction manner, classification tag information entered by a user, or search the Internet for an image whose similarity to the unknown class meets a specified requirement, and perform classification tagging for the unknown class according to tag information of the image on the Internet.

With reference to the first feasible implementation manner of the second aspect, in a third feasible implementation manner, the class learning module is further configured to update an existing classifier according to the automatic clustering result, and train the classifier for the unknown class with the classification tag using the transfer learning method and the updated existing classifier, in order to recognize the unknown target object in the image.

With reference to any one of the second aspect to the third feasible implementation manner of the second aspect, in a fourth feasible implementation manner, the automatic clustering module is further configured to update the historical clustering result according to the automatic clustering result.

As can be seen from the above, in some feasible implementation manners of the present disclosure, feature data is extracted from an image, and expression processing is performed on the extracted feature data. Automatic clustering is performed for features in the image according to a historical clustering result and the feature data that has undergone expression processing. A known class included in an automatic clustering result is grouped into the corresponding known class, in order to recognize a target object of the known class in the image, and a classifier is trained in a machine learning manner, for a target object of an unknown class included in the automatic clustering result, in order to recognize a target object of an unknown class in the image. Therefore, according to the embodiments of the present disclosure, when an image to be recognized includes a target object that does not belong to an existing classification, learning is performed for the target object that does not belong to the existing classification, to obtain a new classifier, thereby implementing recognition of the target object of an unknown class.

DESCRIPTION OF EMBODIMENTS

To make the objectives, technical solutions, and advantages of the present disclosure clearer, the following further describes the present disclosure in detail with reference to the accompanying drawings.

Figure 1:
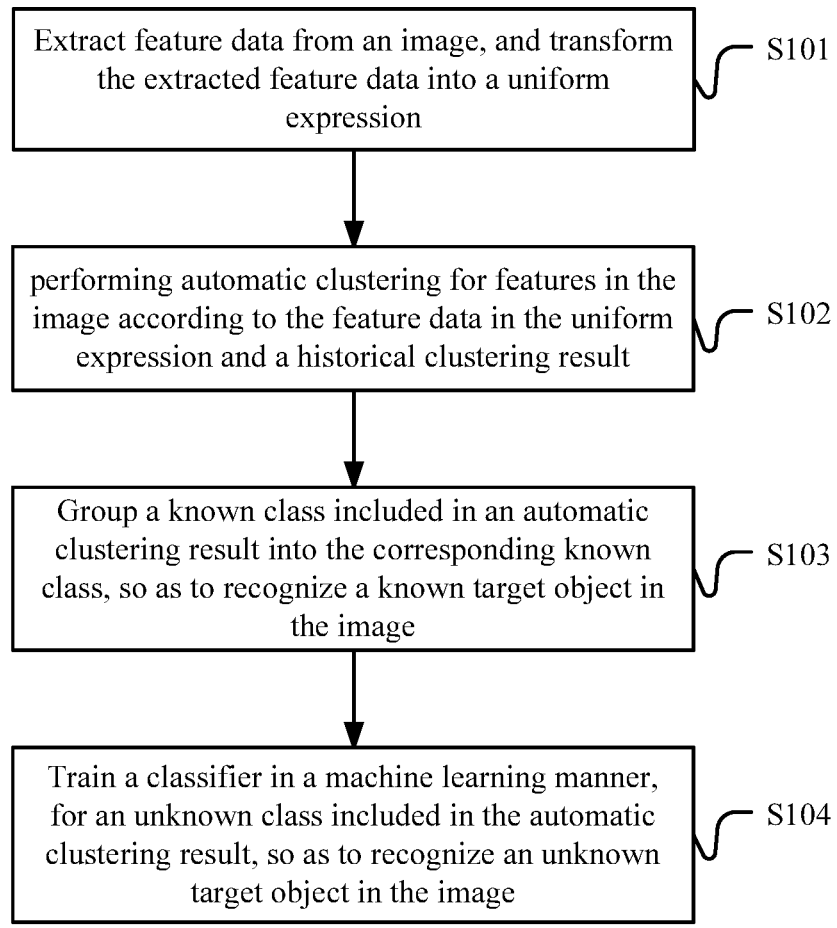
FIG. 1 is a schematic flowchart of an embodiment of a method for recognizing a target object in an image according to the present disclosure.

FIG. 1 is a schematic flowchart of an embodiment of a method for recognizing a target object in an image according to the present disclosure. As shown in FIG. 1, the method may include the following steps.

Step S101: Extract feature data from an image, and transform the extracted feature data into a uniform expression.

In some feasible implementation manners, the feature data of the image described in this embodiment of the present disclosure includes but is not limited to a geometric feature, a shape feature, a color feature, a texture feature, and the like.

In specific implementation, in step S101, the Canny operator, the Laplacian operator, or the Laplacian of Gaussian (LOG) operator may be used to extract an edge feature of the image. The singular value decomposition (SVD) algorithm is used to extract a texture feature of the image. The histogram of oriented gradient (HOG) descriptor or the scale-invariant feature transform (SIFT) algorithm is used to obtain a feature vector of the image, and the principal component analysis (PCA) algorithm, the linear discriminant analysis (LDA) algorithm, the independent components analysis (ICA) algorithm, or the like is used to extract a global or local feature and the like of the image, to achieve functions of removing noise and improving a recognition effect. For example, in the PCA, a low-dimensional feature vector and a projection matrix are used to reconstruct a sample, and modeling for a feature vector is performed by minimizing a reconstruction error. In addition, a dimension with a large variance is retained and a dimension with a small variance is removed. Removing the dimension with a small variance can help reduce uncertainty of sample space, and retaining the dimension with a large variance can maintain a local distance between samples.

Step S102: Perform automatic clustering for features in the image according to the feature data in the uniform expression and a historical clustering result.

In specific implementation, automatic clustering in the present disclosure may refer to unsupervised classification, that is, no prior knowledge is required, a classification of each image of images to be recognized is unknown in advance, and classification is performed according to features of the images to be recognized, to group images with a similar or same feature into a same subclass.

In some feasible implementation manners, when a quantity of subclasses cannot be obtained in advance, a probability distribution model-based method, for example, the Dirichlet process clustering algorithm, may be used to perform clustering analysis, or the Canopy clustering algorithm is first used to perform preprocessing, and then a classification-based method, for example, the K-means clustering algorithm, is used to perform clustering analysis.

In some feasible implementation manners, the historical clustering result may also be updated according to an automatic clustering result.

Step S103: Group a target object of a known class included in an automatic clustering result into the corresponding known class, in order to recognize a target object of the known class in the image.

Step S104: Train a classifier in a machine learning manner, for a target object of an unknown class included in the automatic clustering result, in order to recognize a target object of an unknown class in the image.

Figure 2:
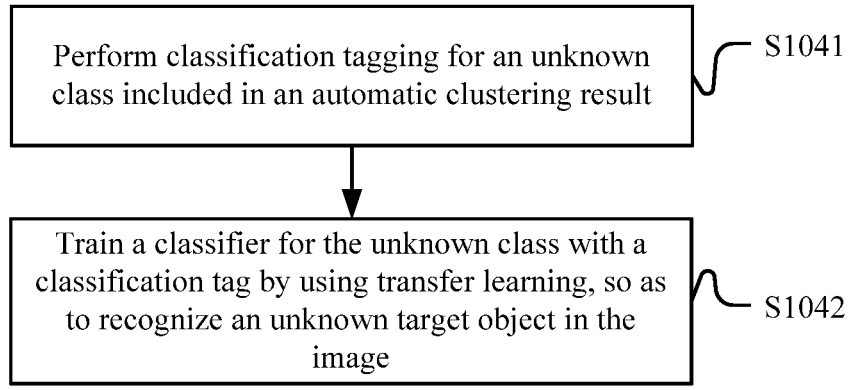
FIG. 2 is a schematic flowchart of an embodiment of step S104 in FIG. 1.

In some feasible implementation manners, as shown in FIG. 2, step S104 may further include the following steps.

Step S1041: Perform classification tagging for the unknown class included in the automatic clustering result.

Step S1042: Train the classifier for the unknown class with a classification tag using transfer learning, in order to recognize the unknown target object in the image.

In specific implementation, in step S1041, the performing classification tagging includes acquiring, in a human computer interaction manner, classification tag information entered by a user, or searching the Internet for an image whose similarity to the unknown class meets a specified requirement, and performing classification tagging for the unknown class according to tag information of the image on the Internet.

For example, it is assumed that a classification of "high mountain" is not included in the known classification. Then, in step S104, a classification tag of "high mountain" may be added by a user to the automatic clustering result. Alternatively, it is found, by searching the Internet, that an object having a high similarity to the unknown class in the clustering result is called "high mountain", and then "high mountain" on the Internet may be used as a classification tag for the unknown class.

In specific implementation, in step S1042, when the classifier is trained for the unknown class with the classification tag using transfer learning, in order to recognize the unknown target object in the image, an existing classifier may be updated according to the automatic clustering result, and the transfer learning method and the updated existing classifier are used to train the classifier for the unknown class with the classification tag, in order to recognize the unknown target object in the image.

In some feasible implementation manners, an existing classifier and a trained classifier may be support vector machine (SVM) classifiers, Bayes classifiers, decision tree classifiers, naive Bayes classifiers (NBC), or the like.

In specific implementation, the transfer learning method described in this embodiment of the present disclosure includes but is not limited to methods such as covariance shift, TrAdaboost, and multi-task-based learning.

According to this embodiment of the present disclosure, after the transfer learning manner is used, data increases along with time, which enables a higher learning starting point, a higher convergence speed, and a better trained classifier. In addition, a new clustering result may be used to update historical clustering, and an existing classifier may be updated according to the automatic clustering result, thereby implementing continual update and continual learning of an entire system, and further optimizing the system continually.

As can be seen from the above, in some feasible implementation manners of the present disclosure, feature data is extracted from an image, and expression processing is performed on the extracted feature data. Automatic clustering is performed for features in the image according to a historical clustering result and the feature data that has undergone expression processing. A known class included in an automatic clustering result is grouped into the corresponding known class, in order to recognize a target object of the known class in the image, and a classifier is trained in a machine learning manner, for a target object of an unknown class included in the automatic clustering result, in order to recognize a target object of an unknown class in the image. Therefore, according to this embodiment of the present disclosure, when an image to be recognized includes a target object that does not belong to an existing classification, learning is performed for the target object that does not belong to the existing classification, to obtain a new classifier, thereby implementing recognition of the target object of an unknown class.

Correspondingly, an embodiment of the present disclosure further provides an image processing apparatus that may be used to implement the method for recognizing a target object in an image according to the present disclosure.

Figure 3:
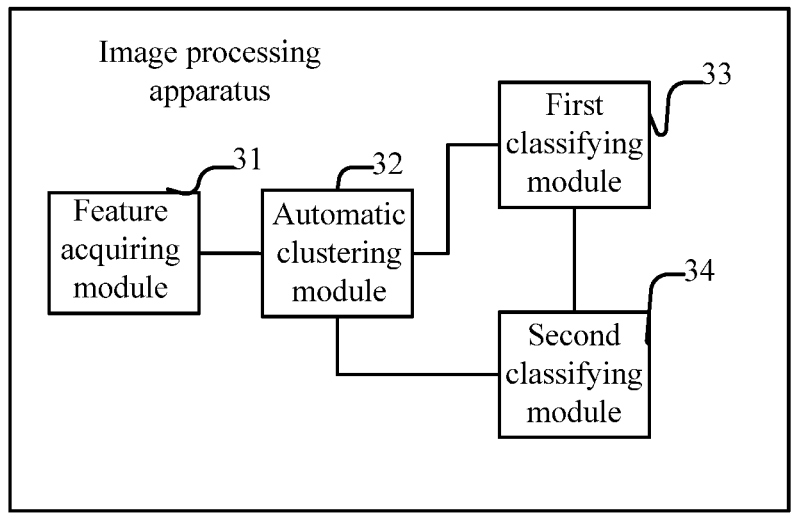
FIG. 3 is a schematic structural diagram of an embodiment of an image processing apparatus according to the present disclosure.

FIG. 3 is a schematic structural diagram of an embodiment of an image processing apparatus according to the present disclosure. As shown in FIG. 3, the image processing apparatus may include a feature acquiring module 31, an automatic clustering module 32, a first classifying module 33, and a second classifying module 34, where the feature acquiring module 31 is configured to extract feature data from an image and transform the extracted feature data into a uniform expression. The automatic clustering module 32 is configured to perform automatic clustering for features in the image according to the feature data in the uniform expression transformed by the feature acquiring module 31 and a historical clustering result. The first classifying module 33 is configured to group a target object of a known class included in an automatic clustering result of the automatic clustering module 32 into the corresponding known class, in order to recognize a target object of the known class in the image, and the second classifying module 34 is configured to train a classifier in a machine learning manner, for a target object of an unknown class included in the automatic clustering result of the automatic clustering module 32, in order to recognize a target object of an unknown class in the image.

In specific implementation, the feature data of the image described in this embodiment of the present disclosure includes but is not limited to a geometric feature, a shape feature, a color feature, a texture feature, and the like.

In specific implementation, the feature acquiring module 31 may use the Canny operator, the Laplacian operator, or the LOG operator to extract an edge feature of the image. Use the SVD algorithm to extract a texture feature of the image. Use a HOG descriptor or the SIFT algorithm to obtain a feature vector of the image, and use the PCA algorithm, the LDA algorithm, the ICA algorithm, or the like to extract a global or local feature and the like of the image, to achieve functions of removing noise and improving a recognition effect. For example, in the PCA, a low-dimensional feature vector and a projection matrix are used to reconstruct a sample, and modeling for a feature vector is performed by minimizing a reconstruction error. In addition, a dimension with a large variance is retained and a dimension with a small variance is removed. Removing the dimension with a small variance can help reduce uncertainty of sample space, and retaining the dimension with a large variance can maintain a local distance between samples.

In specific implementation, the automatic clustering module 32 may not require any prior knowledge, and does not know in advance a classification of each image of images to be recognized, and performs classification according to features of the images to be recognized, to group images with a similar or same feature into a same subclass.

In specific implementation, when a quantity of subclasses cannot be obtained in advance, the automatic clustering module 32 may use a probability distribution module-based method, for example, the Dirichlet process clustering algorithm, to perform clustering analysis, or first use the Canopy clustering algorithm to perform preprocessing, and then use a classification-based method, for example, the K-means clustering algorithm, to perform clustering analysis.

In specific implementation, the automatic clustering module 32 may also update the historical clustering result according to the automatic clustering result.

Figure 4:
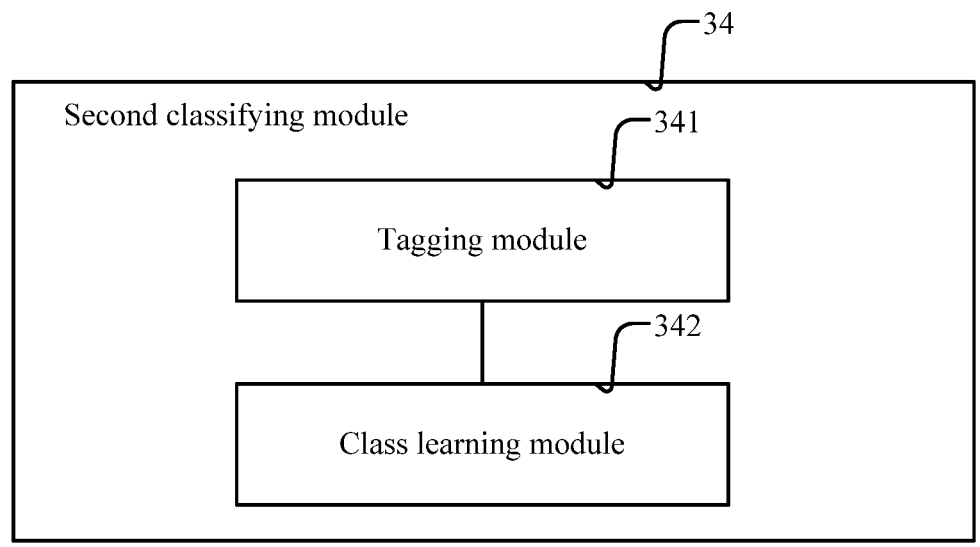
FIG. 4 is a schematic structural diagram of an embodiment of a second classifying module in FIG. 3 according to the present disclosure.

In specific implementation, as shown in FIG. 4, the second classifying module 34 may further include: a tagging module 341 configured to perform classification tagging for the unknown class included in the automatic clustering result, and a class learning module 342 configured to train the classifier for the unknown class with a classification tag using transfer learning, in order to recognize the unknown target object in the image.

In specific implementation, the tagging module 341 may be further configured to acquire, in a human computer interaction manner, classification tag information entered by a user, or search the Internet for an image whose similarity to the unknown class meets a specified requirement, and perform classification tagging for the unknown class according to tag information of the image on the Internet.

For example, it is assumed that a classification of "high mountain" is not included in the known classification. Then, in step S104 of FIG. 1, a classification tag of "high mountain" may be added by a user to the automatic clustering result. Alternatively, it is found, by searching the Internet, that an object having a high similarity to the unknown class in the clustering result is called "high mountain", and then "high mountain" on the Internet may be used as a classification tag for the unknown class.

In specific implementation, the class learning module 342 may be further configured to update an existing classifier according to the automatic clustering result, and train the classifier for the unknown class with the classification tag using the transfer learning method and the updated existing classifier, in order to recognize the unknown target object in the image. In some feasible implementation manners, an existing classifier and a trained classifier may be SVM classifiers, Bayes classifiers, decision tree classifiers, NBC, or the like.

In specific implementation, the transfer learning method described in this embodiment of the present disclosure includes but is not limited to methods such as covariance shift, TrAdaboost, and multi-task-based learning.

According to this embodiment of the present disclosure, after the transfer learning manner is used, data increases along with time, which enables a higher learning starting point, a higher convergence speed, and a better trained classifier. In addition, a new clustering result may be used to update historical clustering, and an existing classifier may be updated according to the automatic clustering result, thereby implementing continual update and continual learning of an entire system, and further optimizing the system continually.

As can be seen from the above, in some feasible implementation manners of the present disclosure, feature data is extracted from an image, and expression processing is performed on the extracted feature data. Automatic clustering is performed for features in the image according to a historical clustering result and the feature data that has undergone expression processing. A known class included in an automatic clustering result is grouped into the corresponding known class, in order to recognize a target object of the known class in the image, and a classifier is trained in a machine learning manner, for a target object of an unknown class included in the automatic clustering result, in order to recognize a target object of an unknown class in the image. Therefore, according to this embodiment of the present disclosure, when an image to be recognized includes a target object that does not belong to an existing classification, learning is performed for the target object that does not belong to the existing classification, to obtain a new classifier, thereby implementing recognition of the target object of an unknown class.

Figure 5:
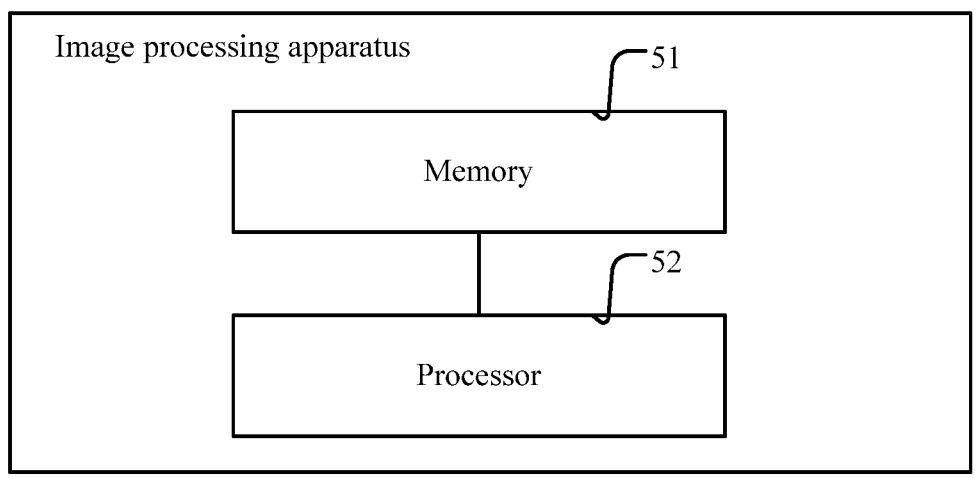
FIG. 5 is a schematic structural diagram of another embodiment of an image processing apparatus according to the present disclosure.

FIG. 5 is a schematic structural diagram of another embodiment of an image processing apparatus according to the present disclosure. As shown in FIG. 5, the image processing apparatus may include a memory 51 and a processor 52, where the processor 52 calls program code stored in the memory 51 and performs the following steps: extracting feature data from an image, and transforming the extracted feature data into a uniform expression, performing automatic clustering for features in the image according to the feature data in the uniform expression and a historical clustering result, grouping a target object of a known class included in an automatic clustering result into the corresponding known class, in order to recognize a target object of the known class in the image, and training a classifier in a machine learning manner, for a target object of an unknown class included in the automatic clustering result, in order to recognize a target object of an unknown class in the image.

In some feasible implementation manners, when performing the step of training a classifier in a machine learning manner, for a target object of an unknown class included in the automatic clustering result, in order to recognize a target object of an unknown class in the image, the processor 52 may further perform the following steps: performing classification tagging for the unknown class included in the automatic clustering result, and training the classifier for the unknown class with a classification tag using transfer learning, in order to recognize the unknown target object in the image.

In some feasible implementation manners, that the processor 52 performs classification tagging includes acquiring, in a human computer interaction manner, classification tag information entered by a user, or searching the Internet for an image whose similarity to the unknown class meets a specified requirement, and performing classification tagging for the unknown class according to tag information of the image on the Internet.

In some feasible implementation manners, when training the classifier for the unknown class with the classification tag using transfer learning, in order to recognize the unknown target object in the image, the processor 52 further performs the following steps updating an existing classifier according to the automatic clustering result, and training the classifier for the unknown class with the classification tag using the transfer learning method and the updated existing classifier, in order to recognize the unknown target object in the image.

In some feasible implementation manners, after the automatically clustering features in the image, the processor 52 may further perform updating the historical clustering result according to the automatic clustering result.

The module in this embodiment of the present disclosure may be implemented by a universal integrated circuit (for example, a central processing unit (CPU)) or an application-specific integrated circuit (ASIC). Persons of ordinary skill in the art may understand that all or some of the steps of the methods in the embodiments may be implemented by a program instructing relevant hardware. The program may be stored in a computer-readable storage medium. The storage medium may include a flash memory, a read-only memory (ROM), a random access memory (RAM), a magnetic disk, and an optical disk.

The foregoing descriptions are merely exemplary embodiments of the present disclosure, but are not intended to limit the protection scope of the present disclosure. Any equivalent modifications made according to the claims of the present disclosure still fall within the scope of the present disclosure.

What is claimed is:

1. A method for recognizing a target object in an image, comprising:
   extracting feature data from the image;
   transforming the extracted feature data into a uniform expression;

performing automatic clustering for features in the image according to the feature data in the uniform expression and a historical clustering result;

grouping the target object of a known class comprised in an automatic clustering result into the corresponding known class, in order to recognize the target object of the known class in the image; and training a classifier in a machine learning manner, for the target object of an unknown class comprised in the automatic clustering result, in order to recognize the target object of the unknown class in the image.

2. The method for recognizing the target object in the image according to claim 1, wherein training the classifier in the machine learning manner, for the target object of the unknown class comprised in the automatic clustering result, in order to recognize the target object of the unknown class in the image comprises:

performing classification tagging for the unknown class comprised in the automatic clustering result; and training the classifier for the unknown class with a classification tag using a transfer learning method, in order to recognize the unknown target object in the image.

3. The method for recognizing the target object in the image according to claim 2, wherein performing classification tagging for the unknown class comprised in the automatic clustering result comprises acquiring, in a human computer interaction manner, classification tag information entered by a user.

4. The method for recognizing the target object in the image according to claim 2, wherein performing classification tagging for the unknown class comprised in the automatic clustering result comprises:

searching the Internet for another image whose similarity to the unknown class meets a specified requirement; and performing classification tagging for the unknown class according to tag information of the image on the Internet.

5. The method for recognizing the target object in the image according to claim 2, wherein training the classifier for the unknown class with the classification tag using the transfer learning method, in order to recognize the unknown target object in the image comprises:

updating an existing classifier according to the automatic clustering result; and training the classifier for the unknown class with the classification tag using the transfer learning method and the updated existing classifier, in order to recognize the unknown target object in the image.

6. The method for recognizing the target object in the image according to claim 1, wherein after performing automatic clustering for features in the image according to the feature data in the uniform expression and the historical clustering result, the method further comprises updating the historical clustering result according to the automatic clustering result.

7. An image processing apparatus, comprising:

a memory; and a processor coupled to the memory, wherein the processor is configured to:

extract feature data from an image;

transform the extracted feature data into a uniform expression;

perform automatic clustering for features in the image according to the feature data in the uniform expression and a historical clustering result;

group a target object of a known class comprised in the automatic clustering result into the corresponding known class, in order to recognize the target object of the known class in the image; and train a classifier in a machine learning manner, for a target object of an unknown class comprised in the automatic clustering result, in order to recognize the target object of the unknown class in the image.

8. The image processing apparatus according to claim 7, wherein the processor is further configured to:

perform classification tagging for the unknown class comprised in the automatic clustering result; and train the classifier for the unknown class with a classification tag using a transfer learning method, in order to recognize the unknown target object in the image.

9. The image processing apparatus according to claim 8, wherein the processor is further configured to acquire, in a human computer interaction manner, classification tag information entered by a user.

10. The image processing apparatus according to claim 8, wherein the processor is further configured to:

search the Internet for another image whose similarity to the unknown class meets a specified requirement; and perform classification tagging for the unknown class according to tag information of the image on the Internet.

11. The image processing apparatus according to claim 8, wherein the processor is further configured to:

update an existing classifier according to the automatic clustering result; and train the classifier for the unknown class with the classification tag using the transfer learning method and the updated existing classifier, in order to recognize the unknown target object in the image.

12. The image processing apparatus according to claim 7, wherein the processor is further configured to update the historical clustering result according to the automatic clustering result.

* * * * *